(12) United States Patent
Swope

(10) Patent No.: US 11,983,228 B1
(45) Date of Patent: May 14, 2024

(54) APPARATUS AND A METHOD FOR THE GENERATION OF ELECTRONIC MEDIA

(71) Applicant: Intellectual Property by Design, LLC, Portland, OR (US)

(72) Inventor: Amber Swope, Portland, OR (US)

( * ) Notice: Subject to any disclaimer, the term of this patent is extended or adjusted under 35 U.S.C. 154(b) by 0 days.

(21) Appl. No.: 18/368,298

(22) Filed: Sep. 14, 2023

(51) Int. Cl.
*G06F 16/951* (2019.01)

(52) U.S. Cl.
CPC .................. *G06F 16/951* (2019.01)

(58) Field of Classification Search
CPC ....................................................... G06F 16/951
USPC ........................................................... 707/737
See application file for complete search history.

(56) References Cited

U.S. PATENT DOCUMENTS

| | | | |
|---|---|---|---|
| 11,275,936 B2 * | 3/2022 | Neumann | G06F 40/216 |
| 11,276,008 B1 | 3/2022 | Carter | |
| 11,361,151 B1 * | 6/2022 | Guberman | G06N 3/08 |
| 11,544,345 B1 * | 1/2023 | Stewart | G06F 40/40 |
| 11,599,588 B1 * | 3/2023 | Tang | G06F 16/55 |
| 2021/0174164 A1 * | 6/2021 | Hsieh | G06Q 30/0282 |
| 2022/0092028 A1 | 3/2022 | Layton | |
| 2023/0009814 A1 | 1/2023 | Hao | |

* cited by examiner

*Primary Examiner* — Michael Pham
(74) *Attorney, Agent, or Firm* — Caldwell Intellectual Property Law

(57) ABSTRACT

An apparatus for the generation of electronic media is disclosed. The apparatus includes at least a processor and a memory communicatively connected to the at least a processor. The memory instructs the processor to receive an entity profile from the user, wherein the entity profile comprises a plurality of entity data. The memory instructs the processor to classify the plurality of entity data into a plurality of entity categories. The memory instructs the processor to generate development data as a function of the classification. The memory instructs the processor to generate electronic media as a function the development data. The memory instructs the processor to display the electronic media using a display device.

20 Claims, 9 Drawing Sheets

US 11,983,228 B1

APPARATUS AND A METHOD FOR THE GENERATION OF ELECTRONIC MEDIA

FIELD OF THE INVENTION

The present invention generally relates to the field of artificial intelligence. In particular, the present invention is directed to an apparatus and a method for the generation of electronic media.

BACKGROUND

The generation of electronic media can be a time-consuming and inefficient process. This is true especially when the electronic media is directed at highly technical processes. Existing methods of generation of electronic media do not take adequate advantage of new and powerful computing tools.

SUMMARY OF THE DISCLOSURE

In an aspect, an apparatus for the generation of electronic media is disclosed. The apparatus includes at least a processor and a memory communicatively connected to the at least a processor. The memory instructs the processor to receive an entity profile from the user, wherein the entity profile comprises a plurality of entity data. The memory instructs the processor to classify the plurality of entity data into a plurality of entity categories. The memory instructs the processor to generate development data as a function of the classification. The memory instructs the processor to generate electronic media as a function of the development data. The memory instructs the processor to display the electronic media using a display device.

In another aspect, a method for the generation of electronic media is disclosed. The method includes receiving, using at least a processor, an entity profile from the user, wherein the entity profile comprises a plurality of entity data. The method includes classifying, using the at least a processor, the plurality of entity data into a plurality of entity categories. The method includes generating, using the at least a processor, development data as a function of the classification. The method includes generating, using the at least a processor, electronic media as a function of the development data. The method includes displaying, using a display device, the electronic media.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for the generation of electronic media is disclosed. The apparatus includes at least a processor and a memory communicatively connected to the at least a processor. The memory instructs the processor to receive an entity profile from the user, wherein the entity profile comprises a plurality of entity data. The memory instructs the processor to classify the plurality of entity data into a plurality of entity categories. The memory instructs the processor to generate development data as a function of the classification. The memory instructs the processor to generate electronic media as a function the development data. The memory instructs the processor to display the electronic media using a display device. Exemplary embodiments illustrating aspects of the present disclosure are described below in the context of several specific examples.

Figure 1:
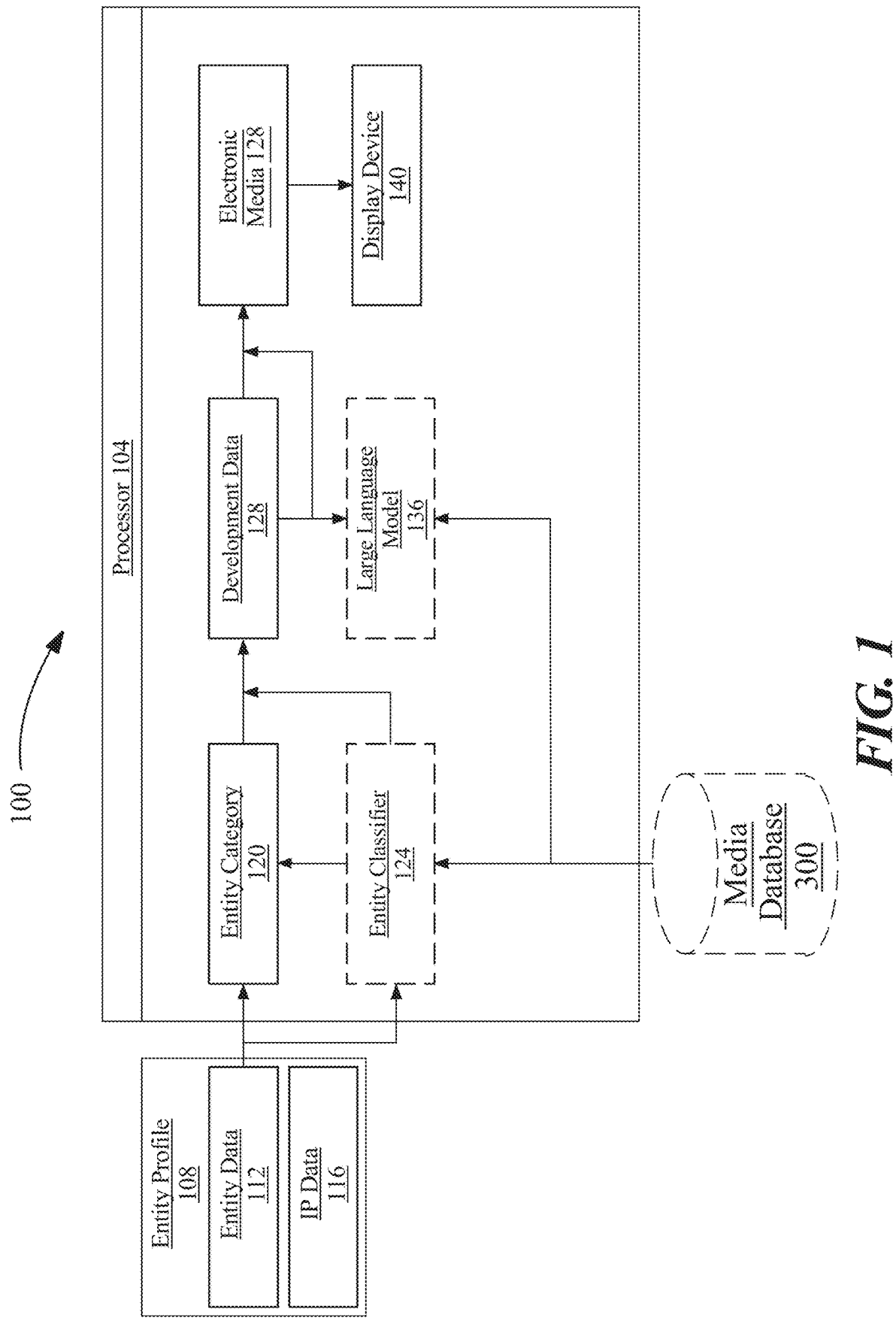
FIG. 1 is a block diagram of an exemplary embodiment of an apparatus for the generation of electronic media.

Referring now to FIG. 1, an exemplary embodiment of apparatus 100 for the generation of electronic media is disclosed is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. Memory may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may be configured to extract an entity profile 108 from a user. For the purposes of this disclosure, an "entity profile" is a data structure including data representing an entity. An entity profile 108 may be made up of a plurality of entity data 112. As used in the current disclosure, "entity data" is information associated with the entity. As used in the current disclosure, an "entity" is an organization comprised of one or more persons with a specific purpose. An entity may include a corporation, organization, business, group, individual, and the like. An entity profile 108 may be created by a processor 104, a user, or a third party. As used in the current disclosure, a "user" is an authoritative figure within the entity. The user may include a manager, owner, or shareholder of the entity. The entity data 112 may contain information regarding the products, services, and/or the overall purpose of the entity. The entity data 112 may additionally include information regarding the entity's assets, sales information, revenue, projected growth, customer reviews, investor reviews, and the like.

With continued reference to FIG. 1, entity data 112 may include intellectual property (IP) data 116. As used in the current disclosure, "intellectual property data" is data associated with the current or future intellectual property of the user. IP data 116 may include any data regarding the user's trade secrets, patents, copyrights, trademarks, design patents, plant patents, and the like. IP data 116 may include any branding, process, machinery, innovation, original works of authorship, artistic works, and the like. This includes any data regarding any material the entity has created or owns that is eligible for intellectual property protections in the United States, and World Intellectual Property Organization (WIPO) contracting states, or any other foreign country. IP data 116 may include a collection of legal rights that an entity or an individual owns related to their creative works, inventions, brands, and the like. IP data 116 may refer to the user's intellectual property rights in the united states or a foreign country. IP data 116 may include data regarding any licensing agreements affiliated with the user's intellectual property rights to third parties. IP data 116 may also include any licenses that the entity has taken from a third party's intellectual property. IP data 116 may include any information regarding the entity's IP including ownership, assignment, inventorship, status, fees owed, IP valuations, industry considerations, potential licensing deals, potential infringers, litigation considerations, past/present federal litigation, past/present state litigation, past/present PTAB actions, past/present TTAB actions, file wrappers, and the like. IP data 116 may include additional information surrounding the IP. In a non-limiting example, if a user has a patent directed at project management software. IP data 116 may include how the software is generated, source code for the software, alternate examples of how the software could be used, and the like. Another non-limiting example is if a user has a trademark for a logo associated with a food brand. IP data 116 may include all drafts regarding the logo. IP data 116 may include the meaning behind the logo and any relevant history associated with the said logo.

With continued reference to FIG. 1, an entity profile 108 may be received by processor 104 through a user input. As used in the current disclosure, a "user input" refers to any information or data that a user provides to processor 104. For example, and without limitation, the user or a third party may manually input entity profile 108 using a graphical user interface of processor 104 or a remote device, such as for example, a smartphone or laptop. Entity profile 108 may additionally be generated through the answer to a series of questions. The series of questions may be implemented using a chatbot, as described herein below. A chatbot may be configured to generate questions regarding any element of the entity profile 108. In a non-limiting embodiment, a user may be prompted to input specific information or may fill out a questionnaire. In an embodiment, a graphical user interface may display a series of questions to prompt a user for information pertaining to the entity profile 108. The entity profile 108 may be transmitted to processor 104, such as via a wired or wireless communication, as previously discussed in this disclosure. The entity profile 108 can be retrieved from multiple third-party sources including the user's inventory records, financial records, human resource records, past entity profiles 108, sales records, user notes and observations, job descriptions, and the like. An entity profile 108 may be placed through an encryption process for security purposes.

With continued reference to FIG. 1, an entity profile 108 may be generated using a smart assessment. As used in this disclosure, a "smart assessment" is a set of questions that asks for user's information as described in this disclosure. In some cases, questions within smart assessment may include selecting a selection from a plurality of selections as answers. In other cases, questions within smart assessment may include free user input as answers. In a non-limiting example, a smart assessment may include a question asking the user regarding IP data; for instance, the question may be "Who is the assignee of your IP portfolio?" In some cases, a smart assessment may be in a form such as, without limitation, survey, transactional tracking, interview, report, events monitoring, and the like thereof. In some embodiments, a smart assessment may include a data submission of one or more documents from the user. A "data submission," for the purpose of this disclosure, is an assemblage of data provided by the user as an input source. In a non-limiting example, data submission may include a user uploading one or more data collections to processor 104. Additionally, or alternatively, user profile 108 may include one or more answers to smart assessment.

With continued reference to FIG. 1, an entity profile 108 may include entity records. As used in the current disclosure, an "entity record" is a document that contains information regarding the entity. Entity records may include a patent, trademark, trade secret, copyright, a file wrapper associated, drawings, technical manuals, engineering drawings, legal documents related to the IP, attorney work product, business records, asset inventory, sales history, sales predictions, and the like. In an embodiment, entity records may be received from databases, various internal/external servers, content management systems, data storage systems, and the like. Processor 104 may identify the entity records using a web crawler. Entity records may include a variety of types of "notes" entered over time by the user, employees of the user, support staff, advisors, attorneys, and the like. Notes may regard any aspect of the entity's business. This may include any innovations, brand ideas, illustrations, meeting notes, agendas, and the like. Notes may additionally include sketches of logos, clothing, footwear, fashion accessories, eyewear, branding material, and the like. Entity records may be converted into machine-encoded text using an optical character reader (OCR).

Still referring to FIG. 1, in some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases, a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and the use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, entity profile 108 may be generated using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to compile the entity profile 108, entity data 112, IP data 116, and the like. In some embodiments, a web crawler may be used to generate any data described within the entirety of this disclosure. The web crawler may be seeded and/or trained with a reputable website, such as the user's business website, to begin the search. A web crawler may be generated by a processor 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract entity records, inventory records, financial records, IP data 116, entity data 112, past entity profiles 108, sales records, user notes, and observations, based on criteria such as a time, location, and the like.

With continued reference to FIG. 1, processor 104 is configured to classify the plurality of entity data 112 into a plurality of entity categories 120. As used in the current disclosure, an "entity category" is a category relating to aspects of an entity. Entity categories 120 may include industry categories, brand categories, technology categories, intellectual property categories, and the like. Entity categories 120 may be categories used to describe aspects of the entity's business or industry. Processor 104 may be configured to generate a plurality of entity categories 120 based on an entity profile 108. Processor 104 may generate a plurality of entity categories 120 based on the industry of the entity and the focus of the intellectual property. In a non-liming example, IP data 116 indicates that an entity has a trademark for a slogan related to a clothing brand. Processor 104 may generate related entity categories related to the clothing industry or technologies in the clothing industry. Processor 104 may generate entity categories 120 based on areas of interest to the public related to the clothing industry. In an embodiment, a processor 104 may create a plurality of entity categories 120. Processor 104 may use historical examples of entity categories 120 to create entity categories 120 tailored to the current entity data 112. Historical examples of entity categories 120 may be received from a database such as database 300. In other embodiments, a processor 104 may classify entity data 112 into preexisting entity categories 120. Entity categories 120 may include categories regarding the innovative or profitable parts of the entity data 112. Entity categories 120 may be used to sort the entity data 112 may project, technology base, brand, industry, public opinion, and the like. Processor 104 may generate an entity category based on previous examples of entity categories. For example, if entity data 112 indicates that the entity is a tech-focused startup. The processor may identify previous examples of entity categories for entities with a similar technology base of the same size. Then processor 104 may tailor those examples of entity categories based on the specific entity data 112 and IP data 116 provided as an input.

With continued reference to FIG. 1, processor 104 may be configured to classify the plurality of entity data 112 into a plurality of entity categories 120 using an entity classifier 124. As used in the current disclosure, an "entity classifier" is a classifier that is configured to classify entity data 112 into a plurality of entity categories 120. Entity classifier 124 may be consistent with the classifier described below in FIG. 2. Inputs into the entity classifier 124 may include entity data 112, IP data 116, entity categories 120, and the like. The output of the entity classifier 124 may comprise a classification of entity data 112 into a plurality of entity categories 120. Entity training data may include a plurality of data entries containing a plurality of inputs that are correlated to a plurality of outputs. Entity training data may include a plurality of entity data correlated to a plurality of entity categories. Entity training data may be received from a database such as a database 300 of FIG. 3. Entity training data may contain information about entity data 112, IP data 116, entity categories 120, and the like. Entity training data may be generated from previous iterations of the classification of entity data 112 into entity categories 120. In some embodiments, entity training data may be iteratively updated with in the input and output results of the entity classifier 124 using a feedback loop. Entity training data may be classified into several different categories based on the needs of the entity. Examples of these categories may include company size, technology base, profit margins, user preference, and the like. Processor 104 may then train the entity classifiers using that specific subset of training data. This may be done with the goal to generate a more tailored machine learning model. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, the processor may be configured to generate a machine learning model, such as entity classifier 124, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. processor 104 may then calculate a likelihood table by calculating probabilities of different data entries and classification labels. processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a machine learning model, such as entity classifier 124, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pytgoreannorm: $l=\sqrt{\Sigma_{i=0}^{n}a_i^2}$, where $a_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, processor 104 may identify a target group as a function of the entity category 120. As used in the current disclosure, a "target group" is the consumer demographic that the media asset have the most appeal to. A target group may include consumers who exhibit similar characteristics (such as age, location, income, profession, or lifestyle) and are considered most likely to consume the media asset from the entity. A target group may be identified for each entity category 120 of the plurality of entity categories 120. A target group may be identified as a function of a consumer demographic. This may be done using historical versions of consumer demographics or target groups for entity categories 120 similar to the current entity categories 120. Processor 104 may be configured to identify a target group by using the entity profile 108. The entity profile 108 may include a sales history of the entity. Processor 104 may classify each sale reflected in the sales history based on the consumers' demographic. This may be done to identify which groups of people are most likely to engage in economic activity with the user. Processor 104 may refine the target group based on the entity category 120 to identify which demographic of user will be interested in each target group. In some embodiments, processor 104 may identify target group using a target group classifier. Target group classifier may be consistent with any classifier disclosed as part of this disclosure. Target group classifier may be configured to receive entity profile 108 and output a target group. Target group classifier may be trained using target group training data. Target group training data may include a plurality of entity profiles or elements of entity profiles related to target groups. Processor 104 may be configured to retrieve target group training data from a database. As used in the current disclosure, a "consumer demographic" is demographic information regarding a customer or a potential customer of the entity. Consumer demographics may include any of the following personal information: age, height, gender, credit, geographical location, financial information, criminal history, medical history, education, profession, personal interests, and the like. Consumer demographics may additionally include records associated with a consumer, such as personal address, social security number, phone number, employment history, social media factors, geographical location, income level, consumer preferences, consumer purchase history, a consumer's digital footprint, and the like. As used in the current disclosure, a "digital footprint" is a collection of data that is left behind as a result of a consumer's online activities In an embodiment, historical versions of consumer demographics and target groups may be stored in a database such as database 300. A target group may refer to a specific group of people that a product, service, or media asset is designed for. The consumer demographic can be defined by various factors such as age, gender, income level, education, occupation, interests, and lifestyle. By identifying a target group, processor 104 may be configured to tailor development data 128 to accurately depict the target audience's interest in a media asset.

With continued reference to FIG. 1, processor 104 generates development data 128 as a function of the entity category 120. As used in the current disclosure, "development data" is data that represents the potential of each entity category's additional development as a media asset. Development data 128 may comprise a prediction of the interest of a target group in a media asset or entity category 120. Interest may be measured in the number of views, clicks, website traffic, purchases, media coverage, sales records, and the like. In an embodiment, development data 128 may additionally include a depiction of the target group of entity category 120. Processor 104 generates development data 128 by comparing the current entity categories 120 to past/present target groups. Processor 104 may predict the target group's interest in the entity category 120 based on past target groups' interest in similar entity categories 120. In a non-limiting example, processor 104 may provide an entity category 120 regarding a patent for a new medical device. Processor 104 may determine based on the entity category 120 a target group, wherein the target group comprises medical professionals. Based on historical versions of this target group processor 104 may predict the development data 128, wherein the development data 128 states that the target group will be mildly interested in the entity category. As used in the current disclosure, a "media asset" is an asset that is chosen to interest a target group of consumers. A media asset refers to any type of electronic media that is created and used for communication, marketing, entertainment, informational, informative purposes, and the like. This can include a wide variety of media formats such as images, videos, audio recordings, animations, graphics, text, books, articles, and any combination thereof. Media assets can be used in a variety of contexts, including websites, social media platforms, advertisements, and multimedia presentations. They are often used to help convey a message or tell a story and can be created using a range of different tools and software. A non-limiting example of media assets includes photographs, infographics, podcasts, videos, animations, quizzes, games, books, articles, sounds, and the like. These assets can be created by individuals, businesses, or organizations, and can be used to engage audiences, promote products or services, or simply entertain. Processor 104 may generate the development data 128 based on one or more development factors associated with the entity category 120 as it relates to the target group. Examples of development factors may include relevance, past consumption metrics, entity goals, subject matter of the entity category, and the like. Development data 128 may be generated by evaluating each entity category according to one or more development factors. Development data 128 may additionally include a prediction of the target group's receptiveness to different times of media assets. In an embodiment, development data 128 may include an identification that the target group is more likely consume a book vs an article.

With continued reference to FIG. 1, processor 104 may generate development data 128 using a development machine-learning model. As used in the current disclosure, a "development machine-learning model" is a machine-learning model that is configured to generate development data. Development machine-learning model may be consistent with the machine-learning model described below in FIG. 2. Inputs to the development machine-learning model may include an entity profile 108, entity data 112, IP data 116, entity categories 120, target groups, consumer demographics, examples of development data 128, and the like. Outputs to the development machine-learning model may include development data 128. Development training data is a plurality of data entries containing a plurality of inputs that are correlated to a plurality of outputs for training a processor by a machine-learning process to correlate target data 116 to examples of development data 128. In an embodiment, development training data may comprise a plurality of entity categories 120 correlated to examples of development data 128. In another embodiment, development training data may comprise a plurality of target groups correlated to examples of development data 128. Development training data may be received from database 300. Development training data may contain information about entity profile 108, entity data 112, IP data 116, entity categories 120, target groups, consumer demographics, examples of development data 128, and the like. In an embodiment, development training data may be iteratively updated as a function of the input and output results of past development machine-learning models. Development training data may be classified into several different categories based on the needs of the target group. Development training data may contain data specific to one target group. Processor 104 may then train the development machine learning model using that specific sub-set of training data. The sub-set of development training data may comprise information regarding the content consumption patterns of the target group. This may be done with the goal to generate a more tailored machine learning model.

With continued reference to FIG. 1, a machine-learning model, such as a development machine-learning model, may be implemented as a fuzzy inferencing system. As used in the current disclosure, a "fuzzy inference" is a method that interprets the values in the input vector (i.e., entity categories 120 and examples of development data 128) and, based on a set of rules, assigns values to the output vector. The fuzzy inference may be consistent with the fuzzy inference described below in FIG. 6. A set of fuzzy rules may include a collection of linguistic variables that describe how the system should make a decision regarding classifying an input or controlling an output. An example of linguistic variables may include variables that represent development data 128. In an embodiment, linguistic variables may be used to depict the predicted interest of target groups in an entity category 120. Examples of linguistic variables may include terms such as "Uninterested," "Moderately Interested," and "Highly Interested." Entity categories 120 and examples of development data 128 may each individually represent a fuzzy set. The development data 128 may be determined by a comparison of the degree of match between a first fuzzy set and a second fuzzy set, and/or single values therein with each other or with either set, which is sufficient for purposes of the matching process.

With continued reference to FIG. 1, processor 104 may be configured to generate a development score as a function of the development data 128. As used in the current disclosure, a "development score" is a scoring of the development data 128, wherein the score reflects the likelihood of a target group will be interested in a media asset. A development score may reflect the likelihood that a given development data 128 will entice a consumer to consume a media asset. A development score may be calculated using a numerical scale. A non-limiting example, of a numerical scale, may include a scale from 1-10, 1-100, 1-1000, and the like, wherein a rating of 1 may represent a less favorable chance of a user engaging in economic activity, whereas a rating of 10 may represent a highly favorable chance of a user engaging in economic activity. A development score may be generated from development data 128, consumer demographics, a target group, entity categories, and the like. A development score may be generated using a machine-learning model. The machine learning model may be trained using score training data. Score training data may include a plurality of data entries containing a plurality of inputs that are correlated to a plurality of outputs for training a processor by a machine-learning process to classify development data 128 to examples of a development score. In an embodiment, score training data may comprise a plurality of development data 128 correlated to a plurality of examples of development data scores. Score training data may be received from database 300. Score training data may contain information about entity profile 108, entity data 112, IP data 116, entity categories 120, target groups, consumer demographics, development data 128, examples of development scores, and the like. Score training data may additionally be generated from any historical versions of any data described herein.

With continued reference to FIG. 1, processor 104 may be configured to generate electronic media 132 as a function of the development data 128. As used in the current disclosure, "electronic media" is any content that uses electronic devices for distribution. Electronic media 132 can take many forms, including text, images, audio, video, and interactive content. Electronic media 132 may include textual media, video media, audio media, and the like. As used in the current disclosure "textual media" is a piece of media comprising primarily text. Textual media may include text such as books, magazines, newspapers, journals, online articles, instructions, technical papers, how-to-guides, biographies, historical accounts, and the like. Textual media includes any type of written content that is designed to convey information, ideas, or opinions to an audience. Electronic media 132 may include a creative work. A "creative work," as used in the current disclosure, is an artistic creation of aesthetic value. Creative work may take the form of an image, sculpture, audio recording, text, engraving, architecture, model, digital image, molding, 3D painting, digital painting, book, article, and the like. In an embodiment, creative work may represent both corporeal and incorporeal creative works. In a non-limiting example, electronic media 132 may be the creative work itself if the creative work is in digital form. Processor 104 may generate electronic media based on the development data 128. In an embodiment, a processor 104 may generate electronic media that is based on an entity's IP data 116. This may include creating a how-to-guide for how to use or recreate the technology described by the IP data 116. It may also include a story behind the innovation, the brand, the entity generated media. Electronic media 132 may describe how the brand was founded or how the founders met. In some embodiments, electronic media 132 may be used to draft a technical paper regarding aspects of the development data 128 or IP data 116. Processor 104 may generate electronic media 132 based on the predicted desires of the target group. Processor 104 may identify the types of electronic media 132 a target group is most interested in. This may be done by identifying the types of media the target group has consumed in the past. The consumption patterns of the target group may be classified into the several categories to identify what is preferred form of electronic media 132. Consumption patterns may include a historical account of what electronic media 132 a consumer has consumed in the past. This may be generated as a function of the entity profile 108 and the target group. The type of electronic media that is identified may include identifying the form of the electronic media (video, text, audio, etc.), the length of the electronic media, the content of electronic media 132, and the like. Identifying the type of electronic media 132 a user is interested in may include a determination of if a user is more likely to read an article or a book. This determination may take account the revenue that may be generated by each form of electronic media 132. This determination may additionally include considerations for time it takes to consume the digital media 132. These determination may be used as an input into the large language model as mentioned herein below. In some embodiments, target groups may be associated with certain types of electronic media. For example, a target group of millennials may be associated with "social media posts."

With continued reference to FIG. 1, processor 104 may generate electronic media 132 using a media machine-learning model. As used in the current disclosure, a "media machine-learning model" is a machine-learning model that is configured to generate electronic media 132. Media machine-learning model may be consistent with the machine-learning model described below in FIG. 2. Inputs to the media machine-learning model may include an entity profile 108, entity data 112, IP data 116, entity categories 120, target groups, consumer demographics, development data 128, development scores, examples of electronic media 132, and the like. Outputs to the media machine-learning model may include electronic media 132. Media training data may include a plurality of data entries containing a plurality of inputs that are correlated to a plurality of outputs for training a processor by a machine-learning process to correlate target data 116 to examples of electronic media 132. In an embodiment, media training data may comprise a plurality of development data 132 correlated to examples of electronic media 132. In an embodiment, media training data may comprise a plurality of development data 132, entity profile 108, and/or entity category 120 correlated to examples of electronic media 132. Media training data may be received from database 300. Media training data may contain information about entity profile 108, entity data 112, IP data 116, development scores, entity categories 120, target groups, development data 128, consumer demographics, examples of electronic media 132, and the like. In an embodiment, media training data may be iteratively updated as a function of the input and output results of past media machine-learning models.

Referring now to FIG. 1, processor 104 may use a large language model 136 (LLM) to generate electronic media 132. A "large language model," as used herein, is a deep learning algorithm that can recognize, summarize, translate, predict and/or generate text and other content based on knowledge gained from massive datasets. Large language model 136 may be trained on large sets of data; for example, training sets may include greater than 1 million words. Training sets may be drawn from diverse sets of data such as, as non-limiting examples, novels, blog posts, articles, emails, and the like. In some embodiments, training sets may include a variety of subject matters, such as, as nonlimiting examples, medical tests, romantic ballads, beat poetry, emails, advertising documents, newspaper articles, historical electronic media, historical textual media, entity profile 108, entity data 112, IP data 116, entity categories 120, target groups, consumer demographics, development data 128, development scores, and the like. and the like. In some embodiments, training sets of LLM 136 may include a plurality of textual media. In some embodiments, training sets of LLM 136 may include a knowledge database. As a non-limiting example, training sets may include scholastic works, scholarly papers, articles, file wrappers, the user's IP, and the like.

With continued reference to FIG. 1, in some embodiments, LLM 136 may be generally trained. For the purposes of this disclosure, "generally trained" means that LLM 136 is trained on a general training set comprising a variety of subject matters, data sets, and fields. In some embodiments, LLM 136 may be initially generally trained. In some embodiments, for the purposes of this disclosure, LLM 136 may be specifically trained. For the purposes of this disclosure, "specifically trained" means that LLM 136 is trained on a specific training set, wherein the specific training set includes data including specific correlations for LLM 136 to learn. As a non-limiting example, LLM 136 may be generally trained on a general training set, then specifically trained on a specific training set. As a non-limiting example, specific training set may include textual media. As a non-limiting example, specific training set may include scholastic works. As a non-limiting example, specific training set may include information from media database 300.

With continued reference to FIG. 1, LLM 136, in some embodiments, may include Generative Pretrained Transformer (GPT), GPT-2, GPT-3, GPT-4, GPT-5, and the like. GPT, GPT-2, GPT-3, GPT-4, and GPT-5 are products of Open AI Inc., of San Francisco, CA. LLM 136 may include a text prediction based algorithm configured to receive an article and apply a probability distribution to the words already typed in a sentence to work out the most likely word to come next in augmented articles. For example, if the words already typed are "Nice to meet," then it is highly likely that the word "you" will come next. LLM 136 may output such predictions by ranking words by likelihood or a prompt parameter. For the example given above, the LLM may score "you" as the most likely, "your" as the next most likely, "his" or "her" next, and the like. LLM 136 may include an encoder component and a decoder component.

Still referring to FIG. 1, LLM 136 may include a transformer architecture. In some embodiments, encoder component of LLM 136 may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, LLM 136 and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM 136 may predict the next word by searching for a set of position in a source sentence where the most relevant information is concentrated. LLM 136 may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, an attention mechanism may include generalized attention self-attention, multi-head attention, additive attention, global attention, and the like. In generalized attention, when a sequence of words or an image is fed to LLM 136, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM 136 may pick up particular parts at different positions in the input sequence and over time compute an initial composition of the output sequence. In multi-head attention, LLM 136 may include a transformer model of an attention mechanism. Attention mechanisms, as described above, may provide context for any position in the input sequence. For example, if the input data is a natural language sentence, the transformer does not have to process one word at a time. In multi-head attention, computations by LLM 136 may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bandanau attention mechanism), LLM 136 may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM 136 may either attend to all source words or predict the target sentence, thereby attending to a smaller subset of words.

With continued reference to FIG. 1, multi-headed attention in encoder may apply a specific attention mechanism called self-attention. Self-attention allows the models to associate each word in the input, to other words. So, as a non-limiting example, the LLM 136 may learn to associate the word "you", with "how" and "are". It's also possible that LLM 136 learns that words structured in this pattern are typically a question and to respond appropriately. In some embodiments, to achieve self-attention, input may be fed into three distinct fully connected layers to create query, key, and value vectors. The query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may have a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow LLM 136 to learn to extract and focus on different combinations of attention from its attention heads.

With continued reference to FIG. 1, LLM 136 may receive input. Input may include a string of one or more characters. An input may additionally include in data disclosed within the entirety of this disclosure. An input may include entity data 112, IP data 116, development data 128, historical electronic media 132, and the like. For example, an input may include one or more words, a sentence, a paragraph, a thought, a query, file wrapper, a patent, a trademark, a copyright, and the like. In some embodiments, in addition to the above-mentioned data a user may input additional information into the LLM 136. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. Query may include, for example a question asking what kind of textual media is needed for a user. Types of textual media may include books, articles, scientific papers, and the like.

With continued reference to FIG. 1, LLM 136 may generate output. In some embodiments, LLM 136 may include multiple sets of transformer architecture as described above. Output may include a textual output. A "textual output," for the purposes of this disclosure is an output comprising a string of one or more characters. Textual output may include, for example, textual media. In some embodiments, textual media may be electronic media 132 from media database 300. In some embodiments, textual output may include a phrase or sentence suggesting what kind of textual media is needed by a user. This may include textual media such as books, articles, letters, messages, and the like.

Still referring to FIG. 1, processor 104 may be configured to display the electronic media 128 using a display device 136. As used in the current disclosure, a "display device" is a device that is used to display a plurality of data and other digital content. A display device 136 may include a user interface. A "user interface," as used herein, is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Figure 2:
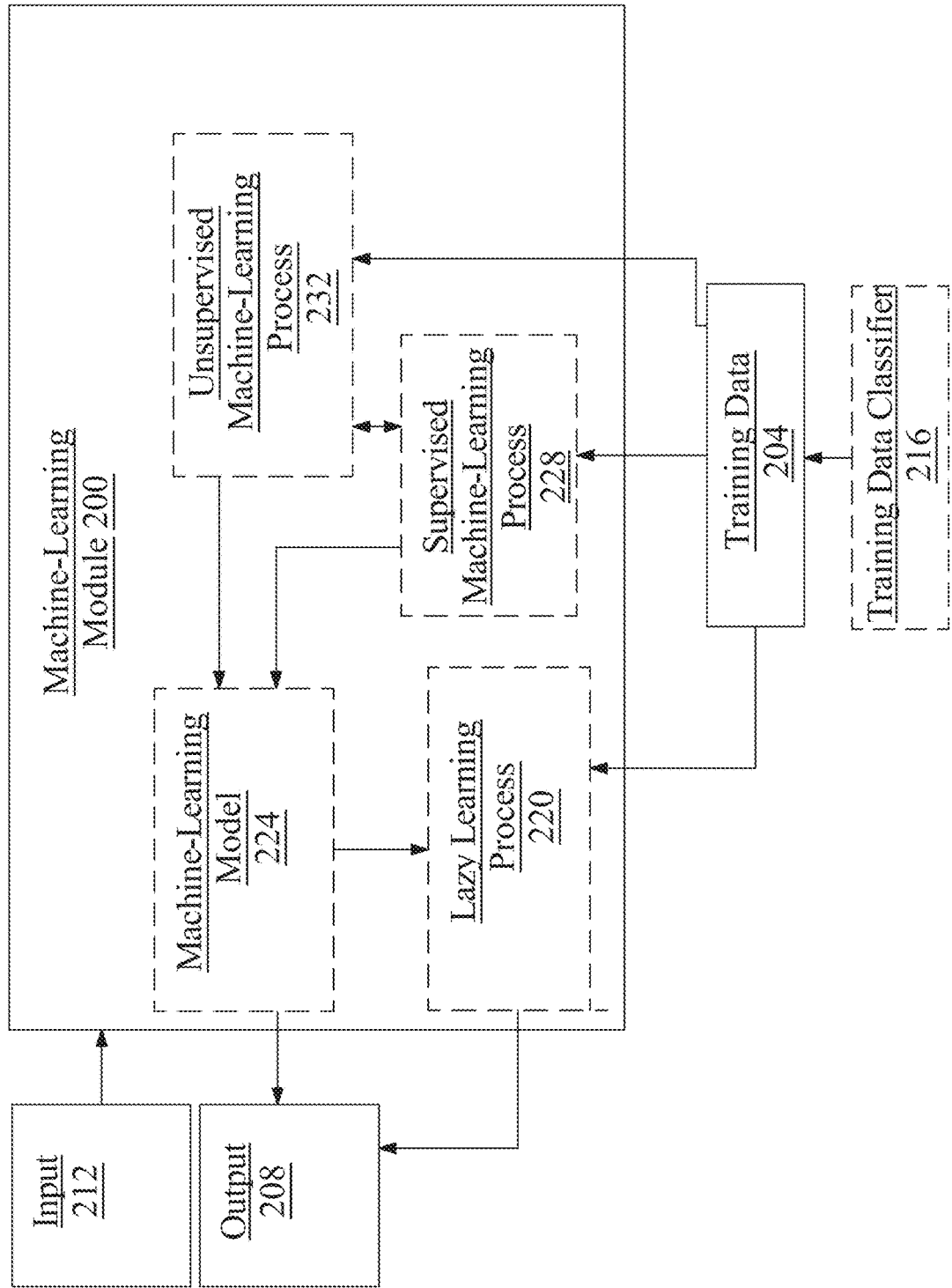
FIG. 2 is a block diagram of an exemplary machine-learning module.

Referring now to FIG. 2, an exemplary embodiment of a machine-learning module 200 that may perform one or more machine-learning processes as described in this disclosure is illustrated. Machine-learning modules may perform determinations, classification, and/or analysis steps, methods, processes, or the like as described in this disclosure using machine-learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, maybe a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 3:
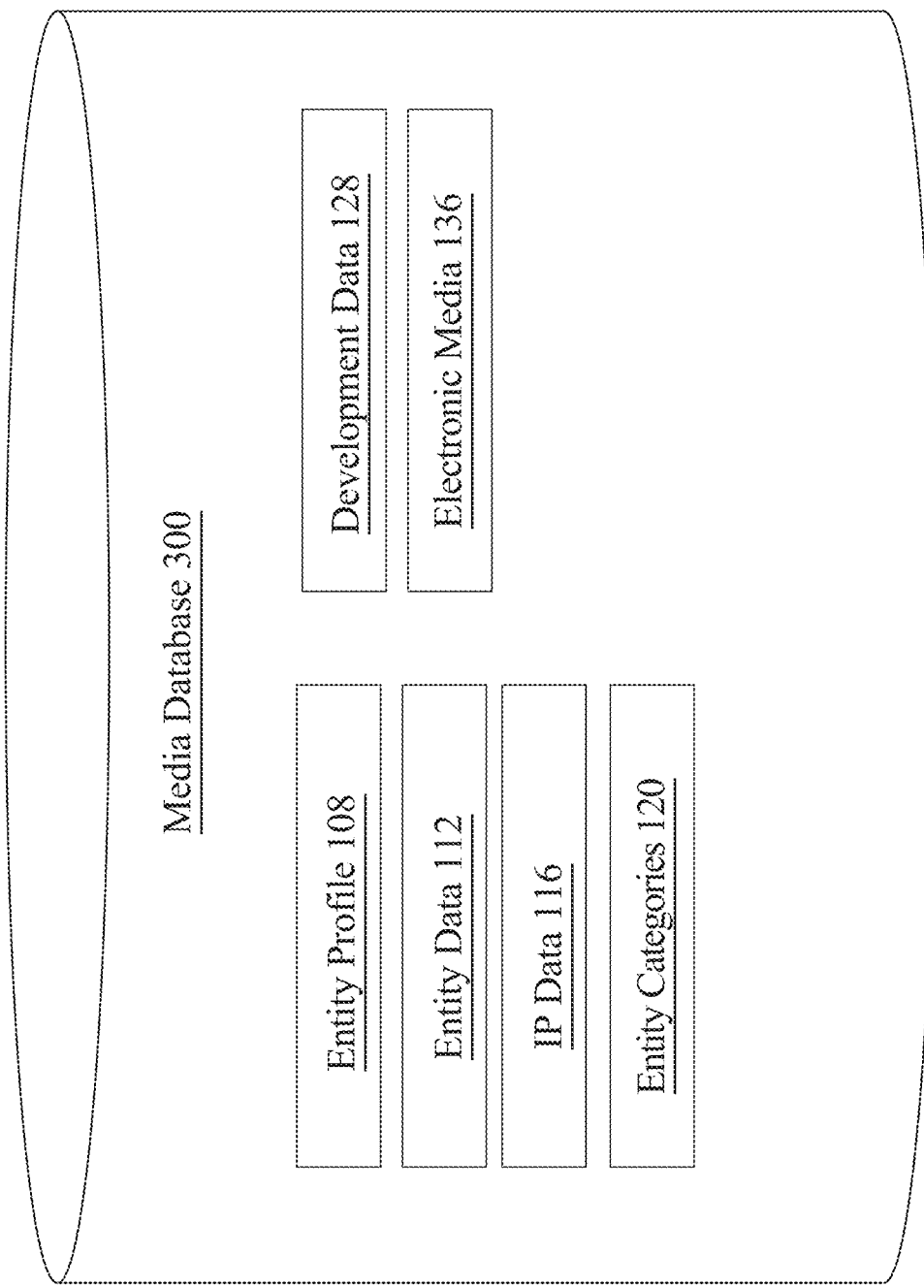
FIG. 3 is a block diagram of an exemplary embodiment of a media database.

Now referring to FIG. 3, an exemplary media database 300 is illustrated by way of block diagram. In an embodiment, any past or present versions of any data disclosed herein may be stored within the media database 300 including but not limited to entity profile 108, entity data 112, IP data 116, entity categories 120, target groups, consumer demographics, development data 128, development scores, electronic media, and the like. Processor 104 may be communicatively connected with media database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local servers or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network. Media database 300 may be implemented, without limitation, as a relational database, a key-value retrieval database such as a NOSQL database, or any other format or structure for use as a database that a person skilled in the art would recognize as suitable upon review of the entirety of this disclosure. Media database 300 may alternatively or additionally be implemented using a distributed data storage protocol and/or data structure, such as a distributed hash table or the like. Media database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
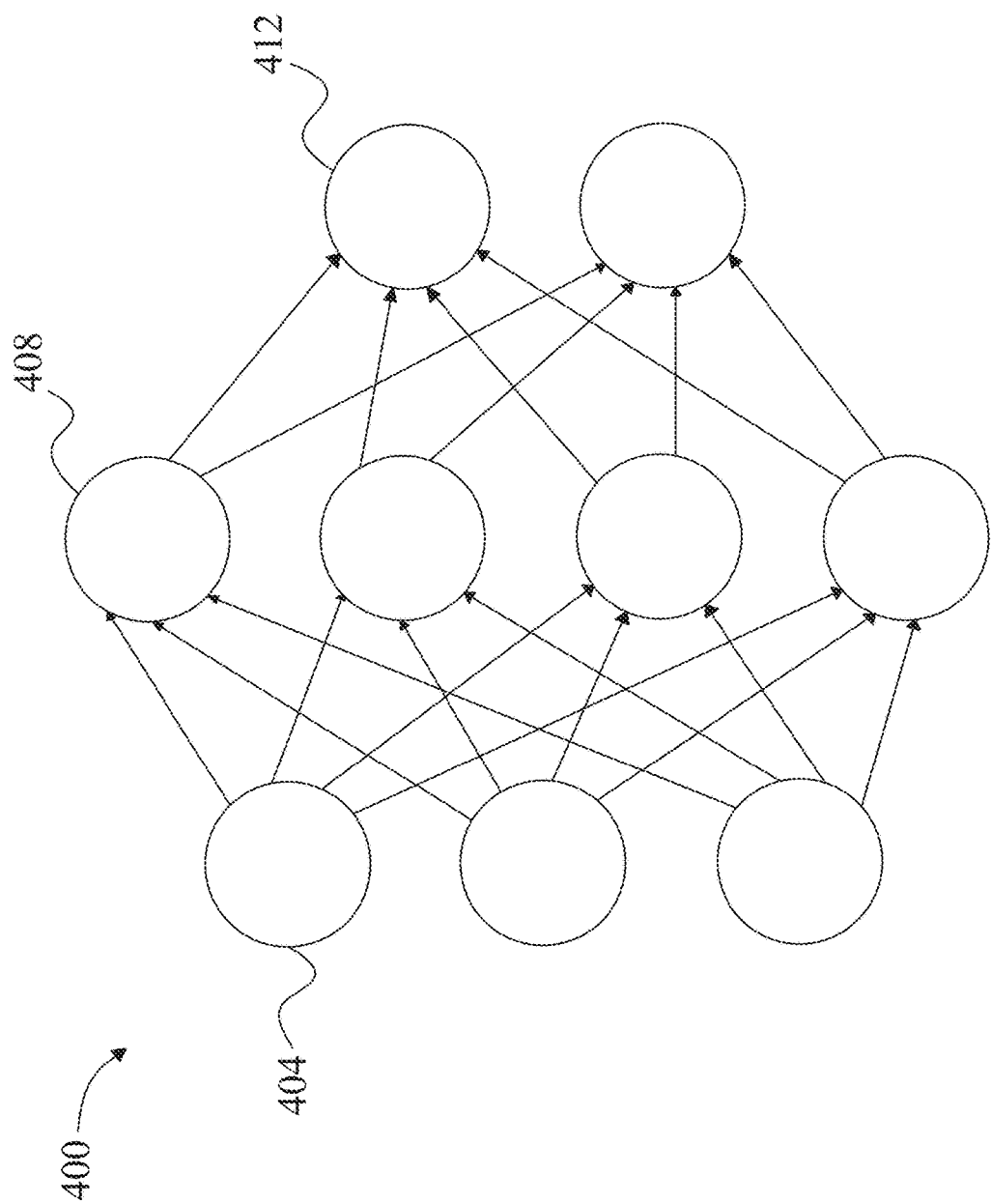
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
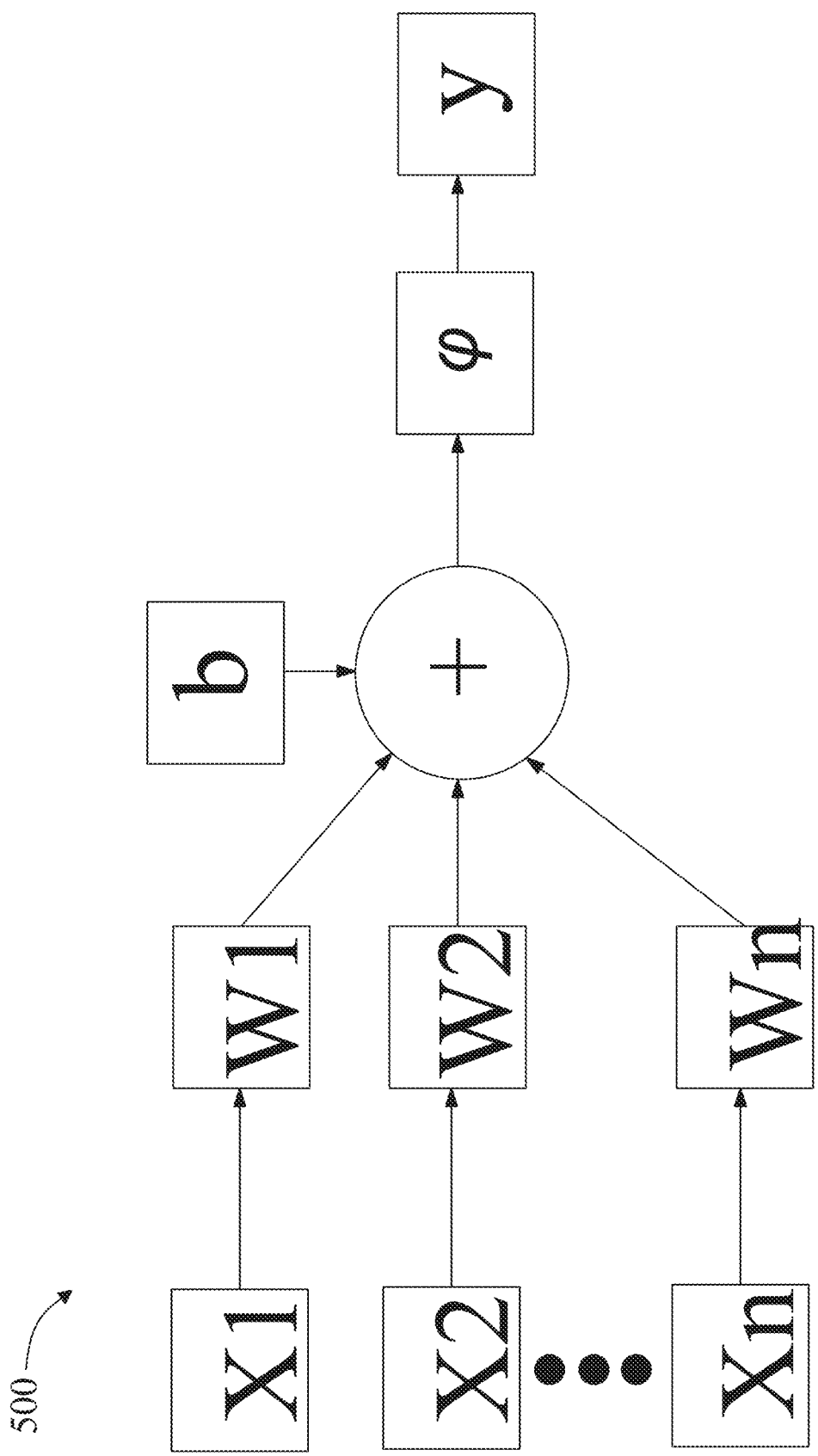
FIG. 5 is a diagram of an exemplary embodiment of a node of a neural network.

Referring now to FIG. 5, an exemplary embodiment of a node of a neural network is illustrated. A node may include, without limitation, a plurality of inputs xi that may receive numerical values from inputs to a neural network containing the node and/or from other nodes. Node may perform a weighted sum of inputs using weights $w_i$ that are multiplied by respective inputs x. Additionally or alternatively, a bias b may be added to the weighted sum of the inputs such that an offset is added to each unit in the neural network layer that is independent of the input to the layer. The weighted sum may then be input into a function co, which may generate one or more outputs y. Weight $w_i$ applied to an input xi may indicate whether the input is "excitatory," indicating that it has strong influence on the one or more outputs y, for instance by the corresponding weight having a large numerical value, and/or an "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
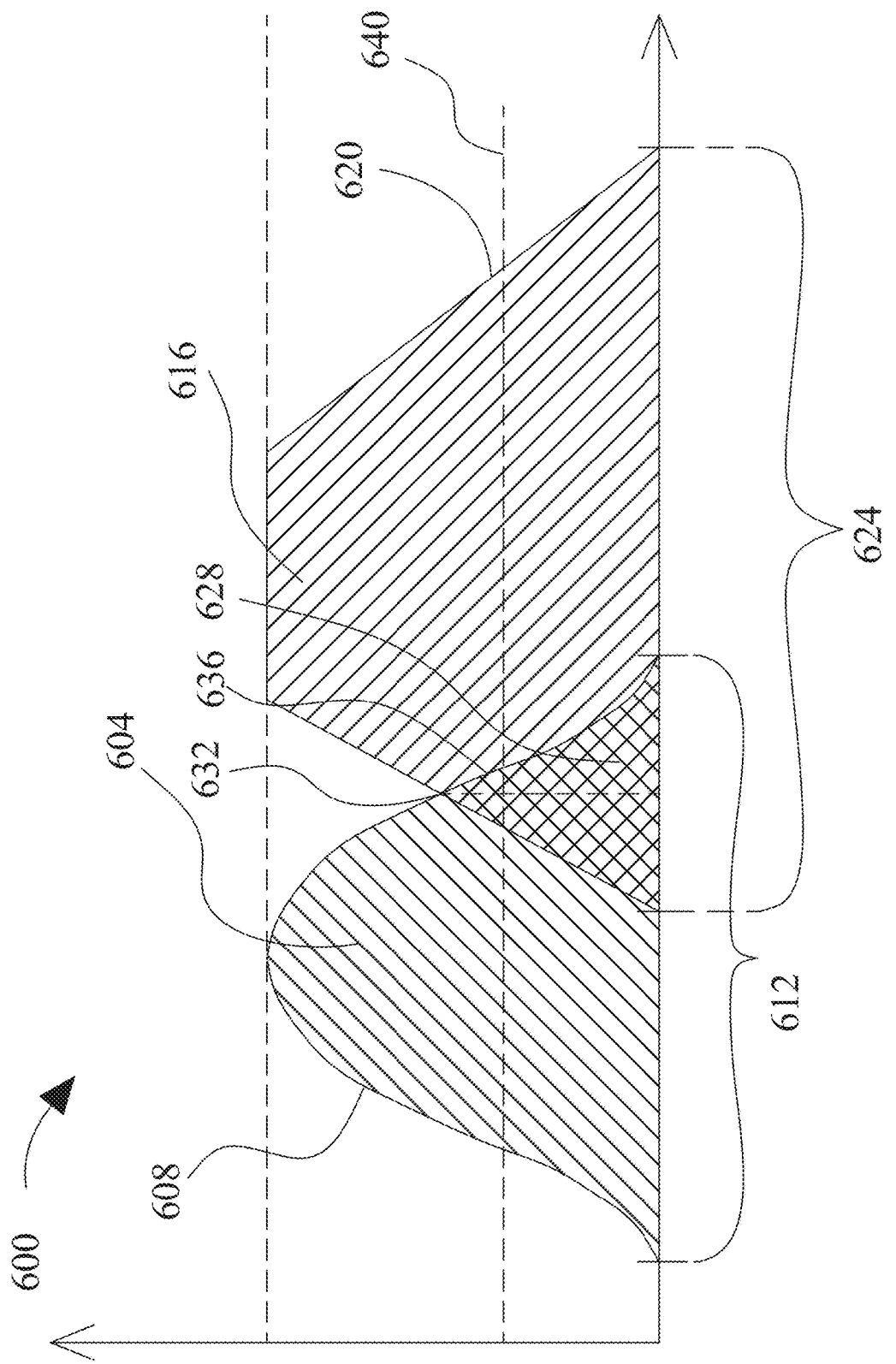
FIG. 6 is an illustration of an exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent entity categories 120 and examples of development data 128 from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input entity categories 120 and examples of development data 128. For instance, an acceptance variable may represent a first measurable value pertaining to the classification of entity categories 120 to examples of development data 128. Continuing the example, an output variable may represent a development data 128 tailored to the entity profile 108. In an embodiment, entity categories 120 and/or examples of development data 128 may be represented by their own fuzzy set. In other embodiments, development data 128 may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any entity categories 120 and examples of development data 128. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, development data 128 may indicate a sufficient degree of overlap with fuzzy set representing entity categories 120 and examples of development data 128 for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both entity categories 120 and examples of development data 128 have fuzzy sets, development data 128 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
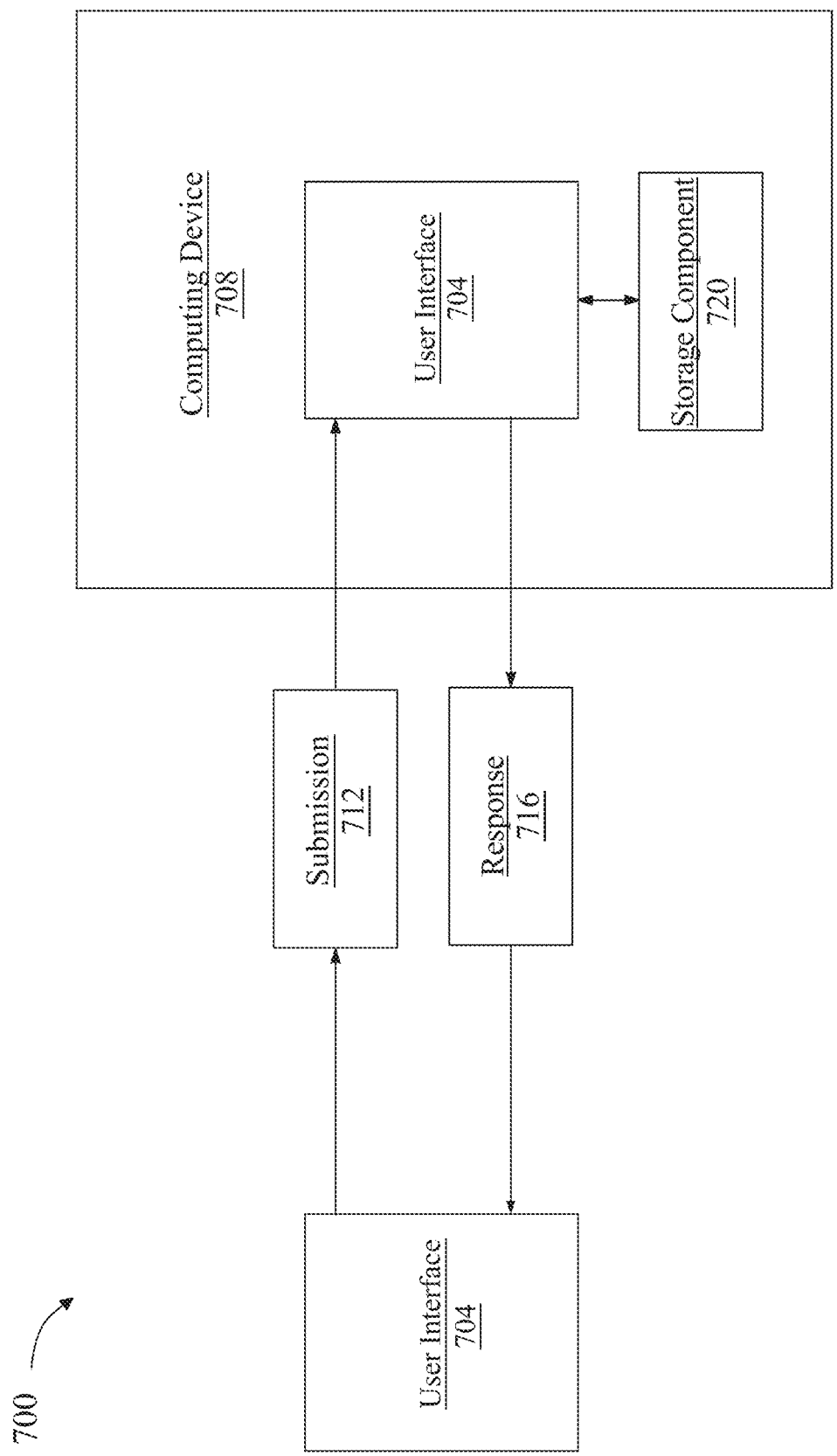
FIG. 7 is an illustration of an exemplary embodiment of a chatbot.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. Alternatively or additionally, user interface 704 may communicate with user device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 708 to the chatbot, and a response 716, from the chatbot to the user interface 704. In many cases, one or both of submission 712 and response 716 are text-based communication. Alternatively or additionally, in some cases, one or both of submission 712 and response 716 are audio-based communication.

Continuing in reference to FIG. 7, a submission 712 once received by computing device 708 operating a chatbot, may be processed by a processor. In some embodiments, processor may process a submission 7112 using one or more of keyword recognition, pattern matching, and natural language processing. In some embodiments, processor may employ real-time learning with evolutionary algorithms. In some cases, processor may retrieve a pre-prepared response from at least a storage component 720, based upon submission 712. Alternatively or additionally, in some embodiments, processor communicates a response 716 without first receiving a submission 712, thereby initiating conversation. In some cases, processor may communicate an inquiry to user interface 704; and the processor is configured to process an answer to the inquiry in a following submission 712 from the user interface 704. In some cases, an answer to an inquiry present within a submission 712 from a user device 704 may be used by computing device 708 as an input to another function.

With continued reference to FIG. 7, A chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, data base, or other data structure to respond to the users entry into the chatbot as a function of a chatbot input. As used in the current disclosure, "Chatbot input" is any response that a candidate or employer inputs into a chatbot as a response to a prompt or question.

With continuing reference to FIG. 7, computing device 708 may be configured to respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 708 may generate two or more decision trees, which may overlap; for instance, a root node of one tree may connect to and/or receive output from one or more terminal nodes of another tree, intermediate nodes of one tree may be shared with another tree, or the like.

Still referring to FIG. 7, computing device 708 may build decision tree by following relational identification; for example, relational indication may specify that a first rule module receives an input from at least a second rule module and generates an output to at least a third rule module, and so forth, which may indicate to computing device 708 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 708 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 7, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 8:
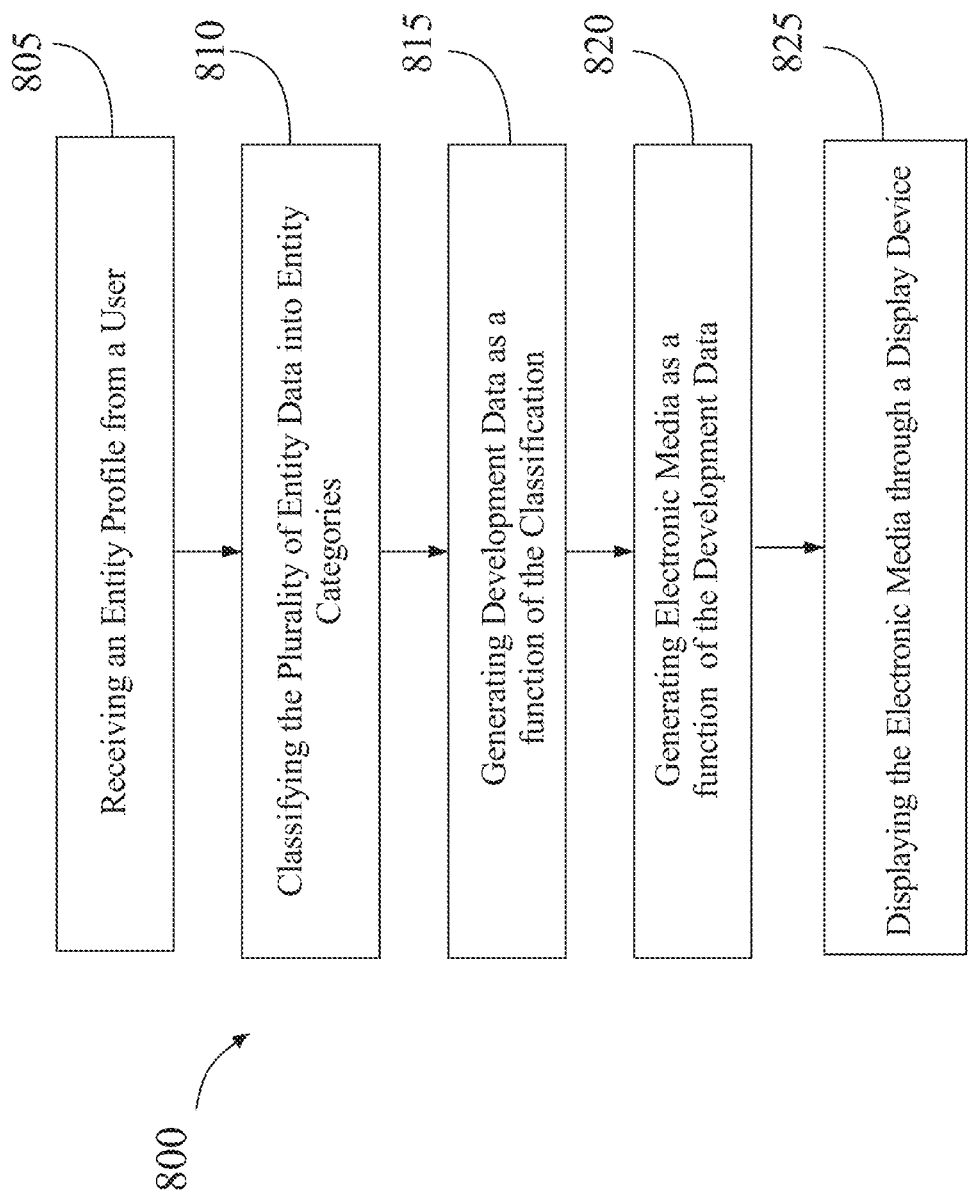
FIG. 8 is a flow diagram of an exemplary method for the generation of electronic media.

Referring now to FIG. 8, a flow diagram of an exemplary method 800 for the generation of electronic media is illustrated. At step 805, method 800 includes receiving, using at least a processor, an entity profile from the user, wherein the entity profile comprises a plurality of entity data. This may be implemented as described and with reference to FIGS. 1-8. In some embodiments, extracting the entity profile may comprise extracting the entity profile using a WebCrawler or a chatbot. In an embodiment, entity data may include IP data.

Still referring to FIG. 8, at step 810, method 800 includes classifying, using the at least a processor, the plurality of entity data into a plurality of entity categories. This may be implemented as described and with reference to FIGS. 1-8. In an embodiment, the method may include generating, using the at least a processor, a target group as a function of the plurality of entity categories. In another embodiment, the method may include classifying, using the at least a processor, the plurality of entity data into a plurality of entity categories using an entity classifier. This may include training the entity classifier using entity training data, wherein the entity training data contains a plurality of data entries containing the plurality of entity data sets as inputs correlated to the plurality of entity categories as outputs and classifying the plurality of entity data into the plurality of entity categories using the entity classifier.

Still referring to FIG. 8, at step 815, method 800 includes generating development data as a function of the classification. This may be implemented as described and with reference to FIGS. 1-8. In an embodiment, the method may include determining, using the at least a processor, a development score as a function of the development data.

Still referring to FIG. 8, at step 820, method 800 includes generating, using the at least a processor, electronic media as a function the development data. This may be implemented as described and with reference to FIGS. 1-8. In an embodiment, the method may include generating, using the at least a processor, the electronic media as a function the development data using a large language model. In another embodiment, the electronic media may include textual media, wherein textual media is a book.

Still referring to FIG. 8, at step 825, method 800 includes displaying, using a display device, the electronic media. This may be implemented as described and with reference to FIGS. 1-8.

With continued reference to FIG. 8, in some embodiments, method 800 may include a step of generating, by the at least a processor, a target group for the electronic media. This may be implemented as described and with reference to FIGS. 1-8. In some embodiments, generating the target group may include receiving target group training data comprising a plurality of entity profiles correlated to target groups. In some embodiments, generating the target group may include training a target group classifier using the target group training data. In some embodiments, generating the target group may include generating the target group using the entity profile and the target group classifier.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
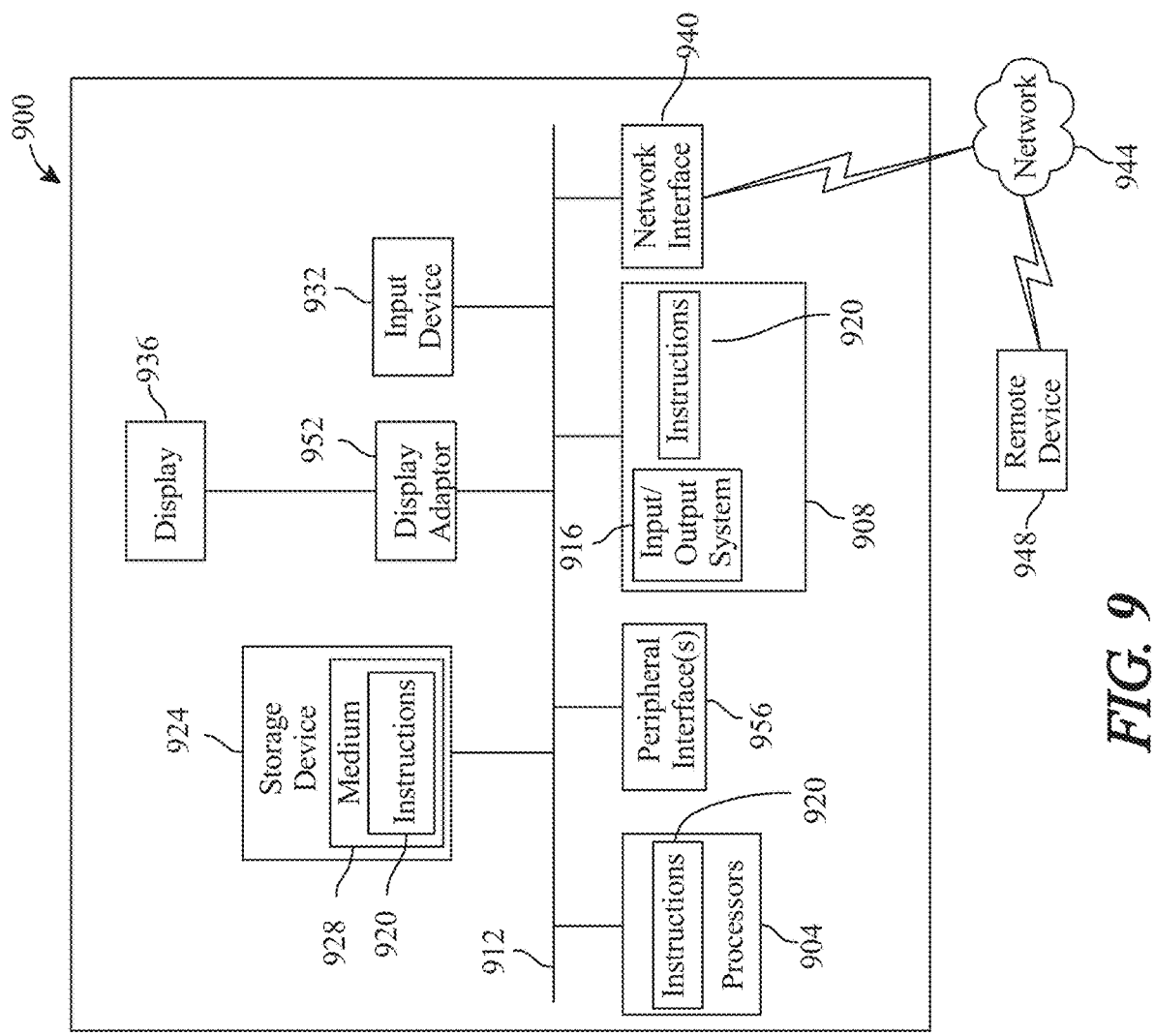
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for a generation of electronic media, wherein the apparatus comprises:
    at least a processor; and
    a memory communicatively connected to the at least a processor, wherein the memory containing instructions configuring the at least a processor to:
        receive an entity profile from the user, wherein the entity profile comprises a plurality of entity data;
        classify the plurality of entity data into a plurality of entity categories;
        generate development data as a function of the classification;
        generate a prediction of an interest of a target group in the plurality of entity categories;
        generate electronic media as a function of the development data and the prediction; and
        display the electronic media through a display device.

2. The apparatus of claim 1, wherein generating the electronic media comprises generating the electronic media using a large language model.

3. The apparatus of claim 1, wherein the memory instructs the processor to determine a development score as a function of the development data.

4. The apparatus of claim 1, wherein generating the development data comprises generating the development data as a function of a target group.

5. The apparatus of claim 1, wherein classifying the plurality of entity data comprises classifying the plurality of entity data using an entity classifier.

6. The apparatus of claim 5, wherein classifying the plurality of entity data using an entity classifier comprises:
    training the entity classifier using entity training data, wherein the entity training data contains a plurality of data entries containing the plurality of entity data sets as inputs correlated to the plurality of entity categories as outputs; and
    classifying the plurality of entity data into the plurality of entity categories using the entity classifier.

7. The apparatus of claim 1, wherein the electronic media comprises textual media.

8. The apparatus of claim 7, wherein the textual media comprises a book.

9. The apparatus of claim 1, wherein the memory contains instructions further configuring the at least a processor to generate a target group for the electronic media, wherein generating the target group comprises:
    receiving target group training data comprising a plurality of entity profiles correlated to target groups;
    training a target group classifier using the target group training data; and
    generating the target group using the entity profile and the target group classifier.

10. The apparatus of claim 1, wherein receiving the entity profile comprises receiving the entity profile using a web crawler.

11. A method for a generation of electronic media, wherein the method comprises:
    receiving, using at least a processor, an entity profile from the user, wherein the entity profile comprises a plurality of entity data;
    classifying, using the at least a processor, the plurality of entity data into a plurality of entity categories;
    generating, using the at least a processor, development data as a function of the classification;
    generating, using the at least a processor, a prediction of an interest of a target group in the plurality of entity categories;
    generating, using the at least a processor, electronic media as a function the development data and the prediction; and
    displaying, through a display device, the electronic media.

12. The method of claim 11, further comprising generating, using the at least a processor, the electronic media as a function the development data using a large language model.

13. The method of claim 11, further comprising determining, using the at least a processor, a development score as a function of the development data.

14. The method of claim 11, further comprising generating, using the at least a processor, the development data as a function of a target group.

15. The method of claim 11, further comprising classifying, using the at least a processor, the plurality of entity data into a plurality of entity categories using an entity classifier.

16. The method of claim 15, wherein classifying the plurality of entity data using an entity classifier comprises:
    training the entity classifier using entity training data, wherein the entity training data contains a plurality of data entries containing the plurality of entity data sets as inputs correlated to the plurality of entity categories as outputs; and
    classifying the plurality of entity data into the plurality of entity categories using the entity classifier.

17. The method of claim 11, wherein the electronic media comprises textual media.

18. The method of claim 17, wherein the textual media comprises a book.

19. The method of claim 11, further comprising generating, by the at least a processor, a target group for the electronic media, wherein generating the target group comprises:
- receiving target group training data comprising a plurality of entity profiles correlated to target groups;
- training a target group classifier using the target group training data; and
- generating the target group using the entity profile and the target group classifier.

20. The method of claim 11, further comprising receiving, using the at least a processor, the entity profile using a web crawler.

\* \* \* \* \*